Dec. 22, 1959 T. G. CONSTANTINE ET AL 2,918,202
SUPPORT ASSEMBLY FOR VEHICLE STEERING COLUMN
Filed Dec. 20, 1957
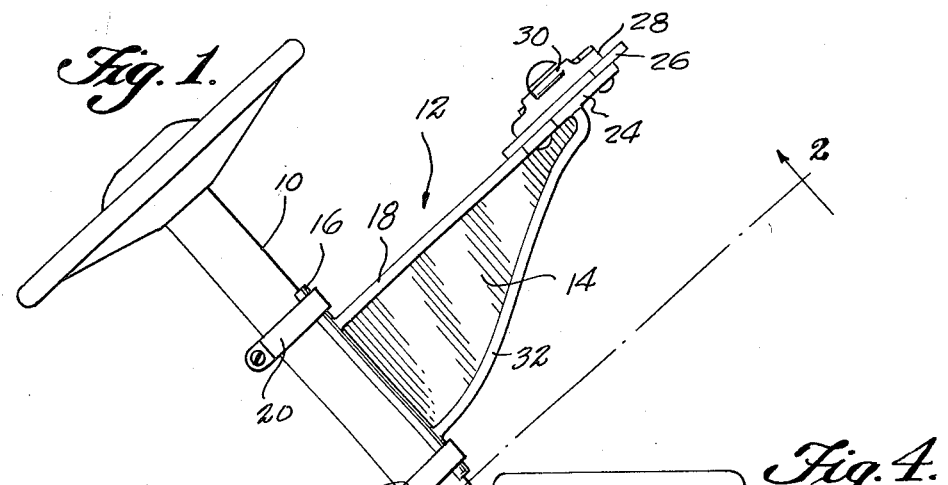
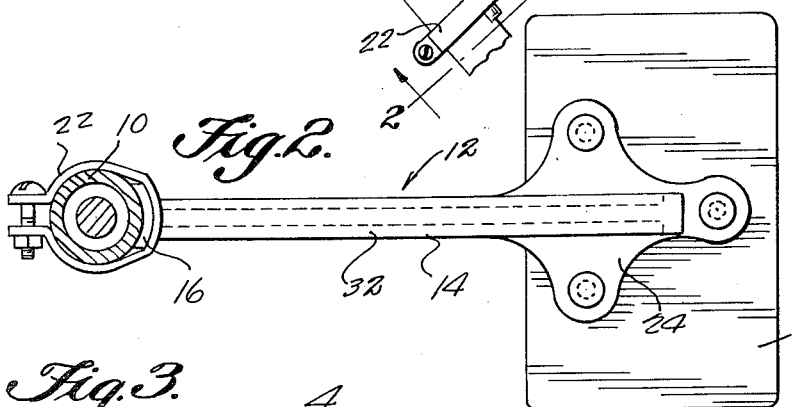
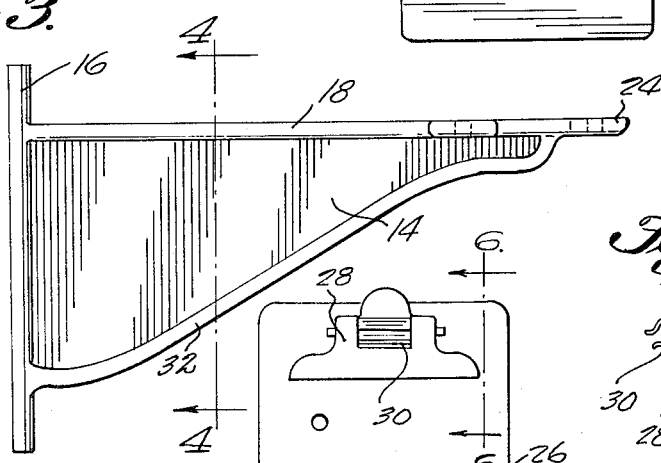
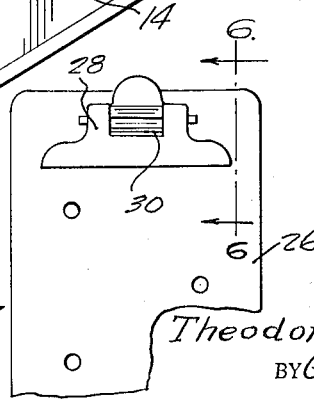
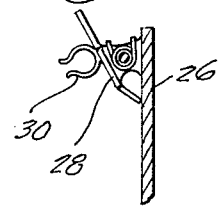
INVENTORS
Theodore G. Constantine,
BY George K. Zenedes,
McMorrow, Berman + Davidson
ATTORNEYS

2,918,202

SUPPORT ASSEMBLY FOR VEHICLE STEERING COLUMN

Theodore G. Constantine and George K. Zenedes, Cleveland, Ohio; said Zenedes assignor to said Constantine Application December 20, 1957, Serial No. 704,122

1 Claim. (Cl. 224—42.45)

The present invention relates to a support assembly for attachment to a vehicle steering column.

An object of the present invention is to provide a support assembly for attachment to a vehicle steering column which lends itself to ready attachment to and detachment from a steering column of a vehicle, one which enables the user thereof to have a writing pad in an accessible location when operating a vehicle, and one which is economically feasible.

Another object of the present invention is to provide a support assembly for attachment to a vehicle steering column which is simple in structure, one sturdy in construction, and one highly effective in action.

These and other objects and advantages of the present invention will be fully apparent from the following description when taken in connection with the annexed drawing, in which:

Figure 1 is an elevational view of the upper end portion of a vehicle steering column with the support assembly of the present invention installed thereon;

Figure 2 is a plan view taken on the line 2—2 of Figure 1;

Figure 3 is an elevational view of the support assembly with the writing pad supporting board removed therefrom;

Figure 4 is a sectional view taken on the line 4—4 of Figure 3;

Figure 5 is a fragmentary plan view of the writing pad support board; and

Figure 6 is a sectional view taken on the line 6—6 of Figure 5.

Referring in greater detail to the drawing in which like numerals indicate like parts throughout the several views, the reference numeral 10 in Figures 1 and 2 designates a vehicle steering column with the support assembly of the present invention designated generally by the reference numeral 12 and shown installed upon the steering column 10.

The supporting assembly of the present invention comprises a bracket 14 including a bar 16 and a ledge 18 on one side of and projecting transversely from the bar 16 intermediate the ends of the latter.

When the support assembly is attached to the steering column 10, the bracket is arranged so that the bar 16 extends along and abuts against the column 10 with the ledge 18 disposed so that it is perpendicular with respect to the column 10. A pair of split ring clamps 20 and 22, constituting clamp means, embrace a portion of the bar 16 on each side of the ledge 18 and embraces adjacent portions of the steering column 10 for attaching the bracket 14 to the steering column 10.

A mounting base 24, having a top surface coplanar with the top surface of the ledge 18, is carried on the free end of the ledge 18. A flat board 26 is fixedly positioned by means of rivets or other conventional means upon the mounting base 24 so that one face abuts and rests upon the top surface of the base 24. Means is provided on the other face of the board 26 for engaging an end portion of a paper pad for holding the pad on the other face of the board 26, the pad not being shown as not being a part of the present invention. This means consists in a spring-biased clip assembly 28, of conventional construction, and having a spring clip 30 secured thereto for the support of a pen or pencil.

A brace bar 32 is a part of the bracket 14 and has one end secured to the bar 16 at a point spaced from the point of attachment of the ledge 18 and has the other end secured to the underside of the mounting base 24.

Holes are provided in the board 26 registrable with holes provided in the base 24 for the reception therethrough of suitable attaching means such as rivets, screws, and the like.

In use, the support assembly of the present invention is readily attached to and detached from a steering column of a vehicle in a position such as to be readily accessible to the operator of the vehicle for the writing of notes upon a pad of paper supported under the clip assembly 28 on the board 26. It will be apparent that the support assembly of the present invention will be most useful to salesmen, and others who have the need for making notations on a pad or sales book while in motion in a vehicle.

While only a single embodiment of the present invention has been shown and described, other embodiments are contemplated and numerous changes and modifications may be made therein without departing from the spirit of the invention as set forth in the appended claim.

What is claimed is:

Memorandum pad supporting apparatus for a motor vehicle having a steering column comprising a metal bracket having a straight upper edge portion disposed normal to the longitudinal axis of the steering column and a sloping lower edge portion, said bracket having its maximum depth adjacent the steering column and the lower edge thereof sloping upwardly from the steering column to have a minimum depth at the outer end of the bracket, said outer end of the bracket having an integrally formed enlarged flat mounting base normal to the longitudinal axis of the steering column which is apertured to receive fastening means extending through the base, said mounting base extending beyond the bracket at each side thereof a distance at least twice the width of the bracket, a flat memorandum supporting board, said board being centrally apertured to receive said fastening means carried by said base, the inner end of said bracket having integrally formed curved portions extending from the upper edge of the bracket to the lower edge of the bracket so as to embrace a portion of the steering column, and clamping means surrounding said curved portions of the bracket and the steering column to mount the bracket on the steering column.

References Cited in the file of this patent

UNITED STATES PATENTS

| | | |
|---|---|---|
| 1,297,021 | Shodron | Mar. 11, 1919 |
| 1,491,893 | Anderson | Apr. 29, 1924 |
| 1,567,903 | Bookman | Dec. 29, 1925 |
| 1,730,790 | Squires | Oct. 8, 1929 |
| 1,822,973 | Konzen | Sept. 15, 1931 |
| 1,865,241 | Dock | June 28, 1932 |
| 2,523,590 | Potter et al. | Sept. 26, 1950 |